April 18, 1933.   E. F. DELERY   1,904,204
FLUID CONTROL VALVE
Filed Dec. 5, 1927
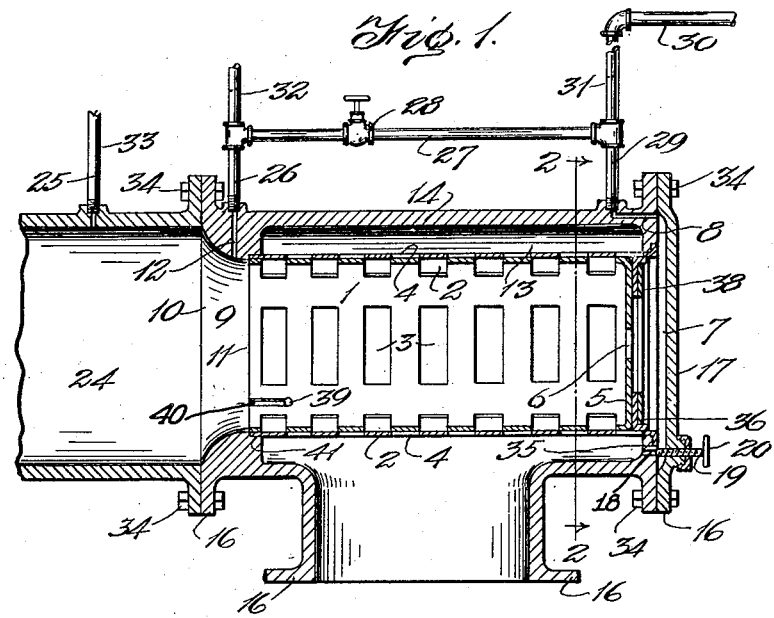
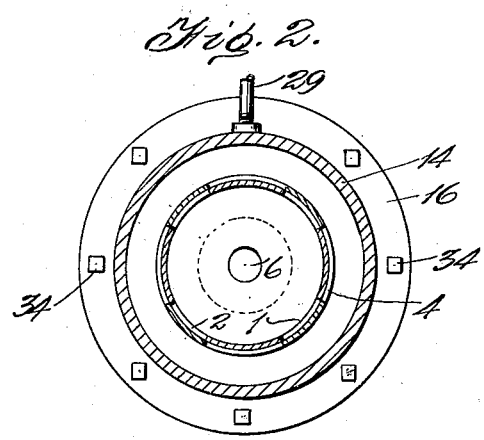
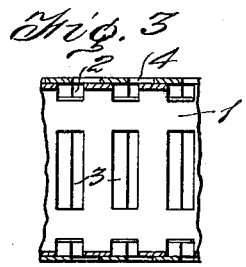
Inventor
Eugene Frank Delery,
By Foster & Codier
Attorneys Patented Apr. 18, 1933

1,904,204

UNITED STATES PATENT OFFICE

EUGENE FRANK DELÉRY, OF NEW ORLEANS, LOUISIANA; ASSIGNED BY DECREE OF DISTRIBUTION TO MRS. EDNA FUSELIER DELÉRY

FLUID CONTROL VALVE

Application filed December 5, 1927. Serial No. 237,718.

This invention relates to valves designed to limit and regulate the flow of fluid through pipe lines, conduits and other devices, and is especially intended to regulate the flow of fluid from filters and the like and will be especially described with regard to this service, though it is intended to be adapted to any other use to which it may be found applicable.

The principal intention of this invention is to provide a flow control valve for an effluent line of filters, whereby the fluid can be made to pass from the filter at a constant rate and, secondly, to pass from the filter at a rate proportionate to the demand on the filter. A further intention of this invention is to provide means whereby the control of the rate of flow shall be independent of all exterior controlling forces such as weighted levers, outside pressure tanks and other similar devices. Provision is furthermore made so that in the event that undue pressure, such as by wash-water, is exerted on the valve it shall close of its own accord to the flow. Means to prevent rotation and overtravel of the valve is likewise provided for.

The invention further consists in the several parts and combinations thereof, defined in the appended claims and described and illustrated in the accompanying drawing, where like parts are designated by like numerals throughout.

Figure 1 is a vertical longitudinal section through the control valve, casing, supply pipe, stationary and moving cylinders, pressure passages and chamber, flanges and variable rate regulator. The pressure piping and valve are shown in full.

Figure 2 is a section on the line 2—2 of Figure 1.

Figure 3 is a detail section through portions of the movable and fixed cylinders and showing the movable cylinder arranged to partially close the ports.

In Figure 1; 1 is the moving part of the valve and consists essentially of a hollow cylinder, provided with multiple orifice ports 3, open at the entrance end to the supply pipe 24, through the velocity increasing chamber 9 and closed at the far end by a rigid head 5 provided with an aperture 6 which registers with a pressure chamber 7. A cupped packing 38 fastened to the back of 5 prevents leakage from the pressure chamber 7 past the rear edge of the cylinder 1 to the discharge chamber 13, and an annular washer 36 suitably secured to the head 5 serves to hold the cupped packing 38 closely against 5. The slot 40 and limit screw 39, which fastens in the stationary cylinder 2 prevents the movable cylinder 1 from revolving.

A stationary cylinder 2, open at one end to the velocity increasing chamber 9 and at the other end to the pressure chamber 7, closely surrounds the movable cylinder 1 and is provided with multiple orifice ports 4 which when the valve is wide open register fully with the orifice ports of the movable cylinder 1. This stationary cylinder is fastened tightly to the outer casing 14 at 41 and 35. The casing 14 consists essentially of a T shaped passage which surrounds the stationary casing 2, is provided with a discharge chamber 13, an entrance velocity chamber 9, where the velocity is increased, of reducing diameter, a static pressure passage 12 and a high pressure passage 8 and is closed by a substantially blank flange 17 to form the pressure chamber 7, also with a variable rate passage 18 which is regulated or closed by a valve 20, set in the flange 17 and provided if desired, with a stuffing box of common construction not deemed necessary here to be shown in detail.

The supply pipe manometer 25 serves to measure the pressure in 24 as shown at 33. The static pressure passage registers with the pipe 26 which serves as a manometer for 9, at 11, and registers with the valve 28, thence through the pipe 27 with the pipe 29 and the high pressure passage 11 and the pressure chamber 7.

The valve is shown at its extreme left hand closed position. We will assume the valves 20 and 28 closed tightly and will proceed to start a flow at a constant rate.

We assume a maximum filter pressure in 24. The fluid will flow into the cylinder 1, through 6 to the pressure chamber 7 where the pressure will rise until it equals that in 24 as there is no flow. We now open valve 20, whereupon flow will take place from 7 through 18 to the outlet of the casing 14. The cylinder 1 will now move to the right and open the ports 4. This will set up a suction in 12 by the action of the flowing fluid through the passage 9. This suction will begin as soon as the fluid flows. We now open 28 slightly. Immediately a flow will pass from 7 to 12 to 11 and the movable cylinder 1 will move further to the right due to the fact that on the entering side of the head 5, the total energy of the fluid acts, while on the opposite side it is reduced by the flow through 8 to 11. The valve 20 is now closed. The movable cylinder 1 will move to the left or right until the ports 3 of the cylinder 1 registering through the ports 4 of the stationary cylinder 2 pass such an amount of fluid that the pressure built up against the partially closed valve 28 and likewise in the pressure chamber 7 equals the total pressure against the entrance face of the head 5, since it has equal areas exposed on both sides.

As the pressure in 24 falls off, the pressure in 12 will be reduced hence more fluid will tend to flow through 28 setting up a differential which will cause the cylinder to move further over to the right until this is balanced in 7. This will continue until the ports are fully registering with each other. When this point is passed as no further opening can take place the valve will move over to the extreme right and close completely with the next differential of pressure drop as this can not be balanced in the pressure chamber 7, at which point the filter is ready for washing.

In washing it is customary to make use of a pressure through the pipe 24 far in excess of the usual filtering pressure. Assume that this pressure is turned in through 24, then the pressure in 29 would become such as to overflow at 30, so that the pressure in the pressure chamber 7 would be less than on the entrance side of the head 5 hence the valve would stay closed to the chamber 13. When the wash water pressure was turned off and the first water from the filter sent to the sewer, as is usual, the pressure in 29 and the chamber 7 would return the valve to its original position at the extreme right, where it would stay until the waste valve was closed and the filter put back into action, when the sequence of acts previously outlined would be repeated. We have seen here a constant differential head existing between 7 and 11 and a constant rate of control.

To get the filter to pass fluid in accordance with the demand, or the height of the fluid in the chamber 13, we merely crack the valve 20 at the passage 18 to suit our wants. Then as the fluid rises in the discharge passage 13 the pressure in the pressure chamber 7 is proportionately increased and the movable cylinder 1 moves to the left and cuts off the ports and likewise if the fluid level in the chamber 13 falls the pressure in the pressure chamber 7 is decreased and the movable cylinder 1 will move to the right and open further the ports and increase the flow to the chamber 13, thus we have a single valve, with no exterior forces whatsoever, able to act either as a constant flow regulator or to regulate in proportion to the demand, with very simple means and without the use of complicated fluid connections and without exterior weights and levers or springs, and also without diaphragms of any kind.

By reducing the entrance area at 11 the following results are secured: A readable difference of pressure between the manometers at 26 and 25 is secured, from which the rate of flow can be calculated or connected up with recording instruments. Furthermore by increasing the velocity head at 11 we get a greater difference of pressure between the passage 12, where the pressure 32 represents the static pressure at this point, and the pressure at the entrance face of the head 5, which is equal to the static pressure at 11 plus the velocity head at that point less a very slight friction head, and the pressure against the far side of the valve 28, which until balanced by the movement of the cylinder 1, is equal to the pressure at the entrance face of the head 5 less the flow differential through the valve 28, which will obtain until the movable cylinder moves over to the right sufficiently to balance the pressures on both sides of the head 5.

The scientific fact that the pressure against the head 5 is always equal to the sum of the static and velocity heads, less a small friction head loss, is based on the action of a closed end pipe with multiple orifices as demonstrated by the inventor and by other investigators. It is believed that this is the first time that this principle has been made use of to serve to control the flow of fluids, and this will be broadly claimed in this invention.

The loss of head through the ports can be made whatever is desired by making these of such size and number as desired.

Attention is called to the fact that the passage 27 between the passages 12 and 8, which register between the chambers 9, at 11, and 7 are an important part of this invention and can be made integral with the casing of the valve, if so desired, without departing from the spirit of this invention, also that an orifice can be substituted for the valve 28 without departing from the spirit of this invention. It is believed that this invention improves on other devices for similar purposes, because it contains integral in itself an entrance velocity chamber where the velocity is increased over that in the supply pipe 24 so that a readable and appreciable pressure difference is secured at 33 and 32 whereby recording instruments attached to 25 and 26 can be arranged to record the flow to the controller valve, in that the usual Venturi tube is eliminated without sacrifice of the recording means for registering the flow to the control valve; because the body of the control valve occupies minimum space; because the control valve can be revolved 180 degrees about its horizontal axis and will function equally well in all positions; because of the simplicity of its construction and operation and low construction cost; because it is the only control valve which will give a constant rate of flow without floats, levers, exterior constant flow introduced from another source of supply; because it supplies its own operating means; because it can be set to give a constant rate of flow by the mere adjustment of a single valve or orifice, because this constant rate of flow can be made to vary with the demand by merely setting another valve (20), because an excess supply, such as wash water, will close the valve until the washing process has ceased; because it is the only control valve in which the total energy of the fluid represented by the static pressure plus the impact of the fluid acts to operate the moving parts.

I am aware that fluid control valves have been used before hence do not claim a fluid control valve as such but I claim:

1. In a fluid control valve an interior hollow reciprocating cylinder open at the entrance end, a rigid head at the end of the said cylinder farthest away from the entrance, an aperture in the rigid head and multiple ports in the circumferential wall of the reciprocating cylinder, a cup packing attached to the rear of the partition, an annular washer attaching the cup packing to the head, and means for attaching the annular washer to the partition, means to prevent the rotation of the reciprocating cylinder.

2. In a fluid control valve, a substantially T-shaped casing having an inlet at one end of its head and an outlet through its stem, a multiple ported stationary cylinder within the head of the casing concentric to its walls and open at both ends, one end of the cylinder communicating with the inlet of the casing, means closing the opposite end of the casing head to provide a pressure chamber at the corresponding end of the cylinder, an inner cylinder slidably fitted within the first cylinder and provided with ports movable into and out of registry with the first mentioned ports upon sliding of the inner cylinder, a head on the end of the inner cylinder adjacent the pressure chamber, said head being provided with an opening communicating with the pressure chamber, and a cup packing carried by said head and facing the pressure chamber.

3. In a fluid control valve, a substantially T-shaped casing having an inlet at one end of its head and an outlet through its stem, a multiple ported stationary cylinder within the head of the casing concentric to its walls and open at both ends, one end of the cylinder communicating with the inlet of the casing, means closing the opposite end of the casing head to provide a pressure chamber at the corresponding end of the cylinder, an inner cylinder slidably fitted within the first cylinder and provided with ports movable into and out of registry with the first mentioned ports upon sliding of the inner cylinder, a head on the end of the inner cylinder adjacent the pressure chamber, said head being provided with an opening communicating with the pressure chamber, a fluid conduit leading from the inlet to the pressure chamber, and a valve in said conduit.

4. In a fluid control valve, a substantially T-shaped casing having an inlet at one end of its head and an outlet through its stem, a multiple ported stationary cylinder within the head of the casing concentric to its walls and open at both ends, one end of the cylinder communicating with the inlet of the casing, means closing the opposite end of the casing head to provide a pressure chamber at the corresponding end of the cylinder, an inner cylinder slidably fitted within the first cylinder and provided with ports movable into and out of registry with the first mentioned ports upon sliding of the inner cylinder, a head on the end of the inner cylinder adjacent the pressure chamber, said head being provided with an opening communicating with the pressure chamber, a fluid conduit leading from the inlet to the pressure chamber, a valve in said conduit, and a valved passage leading from the pressure chamber to the outlet.

5. In a fluid control valve, a substantially T-shaped casing having an inlet at one end of its head contracted at its inner end to form a velocity increasing portion for the fluid flowing therethrough, and an outlet through its stem, a multiple ported stationary cylinder within the head of the casing concentric to its walls and open at both ends, one end of the cylinder communicating with the inlet of the casing, means closing the opposite end of the casing head to provide a pressure chamber at the corresponding end of the cylinder, an inner cylinder slidably fitted within the first cylinder and provided with ports movable into and out of registry with the first mentioned ports upon sliding of the inner cylinder, a head on the end of the inner cylinder adjacent the pressure chamber, said head being provided with an opening communicating with the pressure chamber, and a cup packing carried by said head and facing the pressure chamber.

6. In a fluid control valve, a substantially T-shaped casing having an inlet at one end of its head contracted at its inner end to form a velocity increasing portion for the fluid flowing therethrough, and an outlet through its stem, a multiple ported stationary cylinder within the head of the casing concentric to its walls and open at both ends, one end of the cylinder communicating with the inlet of the casing, means closing the opposite end of the casing head to provide a pressure chamber at the corresponding end of the cylinder, an inner cylinder slidably fitted within the first cylinder and provided with ports movable into and out of registry with the first mentioned ports upon sliding of the inner cylinder, a head on the end of the inner cylinder adjacent the pressure chamber, said head being provided with an opening communicating with the pressure chamber, a fluid conduit leading from the inlet to the pressure chamber, and a valve in said conduit.

7. In a fluid control valve, a substantially T-shaped casing having an inlet at one end of its head contracted at its inner end to form a velocity increasing portion for the fluid flowing therethrough, and an outlet through its stem, a multiple ported stationary cylinder within the head of the casing concentric to its walls and open at both ends, one end of the cylinder communicating with the inlet of the casing, means closing the opposite end of the casing head to provide a pressure chamber at the corresponding end of the cylinder, an inner cylinder slidably fitted within the first cylinder and provided with ports movable into and out of registry with the first mentioned ports upon sliding of the inner cylinder, a head on the end of the inner cylinder adjacent the pressure chamber, said head being provided with an opening communicating with the pressure chamber, a fluid conduit leading from the inlet to the pressure chamber, a valve in said conduit, and a valved passage leading from the pressure chamber to the outlet.

In testimony whereof I hereby affix my signature.

EUGENE FRANK DELÉRY.